United States Patent

Hounam et al.

[11] Patent Number: 5,821,895
[45] Date of Patent: Oct. 13, 1998

[54] METHOD AND DEVICE FOR LOCATING AND IDENTIFYING OBJECTS BY MEANS OF AN ENCODED TRANSPONDER

[75] Inventors: David Hounam, Wessling; Karl-Hans Waegel, Gilching, both of Germany

[73] Assignee: Deutsche Forschungsanstalt Fur Luft-Und Raumfahrt E., Cologne, Germany

[21] Appl. No.: 652,346

[22] Filed: May 23, 1996

[30] Foreign Application Priority Data

May 24, 1995 [DE] Germany .......................... 195 18 724.5

[51] Int. Cl.⁶ ............................. G01S 13/90; G01S 13/78
[52] U.S. Cl. ................................. 342/25; 342/42; 342/45
[58] Field of Search .................. 342/25, 42, 43, 342/44, 45, 13

[56] References Cited

U.S. PATENT DOCUMENTS

| | | | |
|---|---|---|---|
| 5,001,486 | 3/1991 | Bachtiger | 342/42 |
| 5,486,830 | 1/1996 | Axline, Jr. et al. | 342/43 |
| 5,495,248 | 2/1996 | Kawase et al. | 342/25 |
| 5,497,158 | 3/1996 | Schmid et al. | 342/90 |

FOREIGN PATENT DOCUMENTS

| | | |
|---|---|---|
| 3248879 | 3/1984 | Germany . |
| 3315499 | 2/1987 | Germany . |
| 2165413 | 4/1986 | United Kingdom . |

OTHER PUBLICATIONS

W.M. Kemp and N.M. Martin; A Synthetic Aperture Radar Calibration Transponder AT C–Band; record of the IEEE International Radar Conference (Cat. No. 90CH2882–9), pp. 81–85, 1990.

R. Schenk et al; Proceedings of the 7th Australian Microelectronics Conference; A Single Chip DSP for Multiple Echo Transponders; pp. 93–101.

Primary Examiner—John B. Sotomayor
Attorney, Agent, or Firm—Browdy and Neimark

[57] ABSTRACT

A method and device for locating and identifying objects uses an encoding transponder in combination with the use of an SAR device carried in aircraft and spacecraft. Signals transmitted by the SAR device are received by the transponder are provided with an additional dominant signal structure and subsequently retransmitted back to the SAR device. Once the modulated code sequence is known, a signal correlation can be carried out between the signals output by the transponder and the signal reflected from the environment.

7 Claims, 1 Drawing Sheet

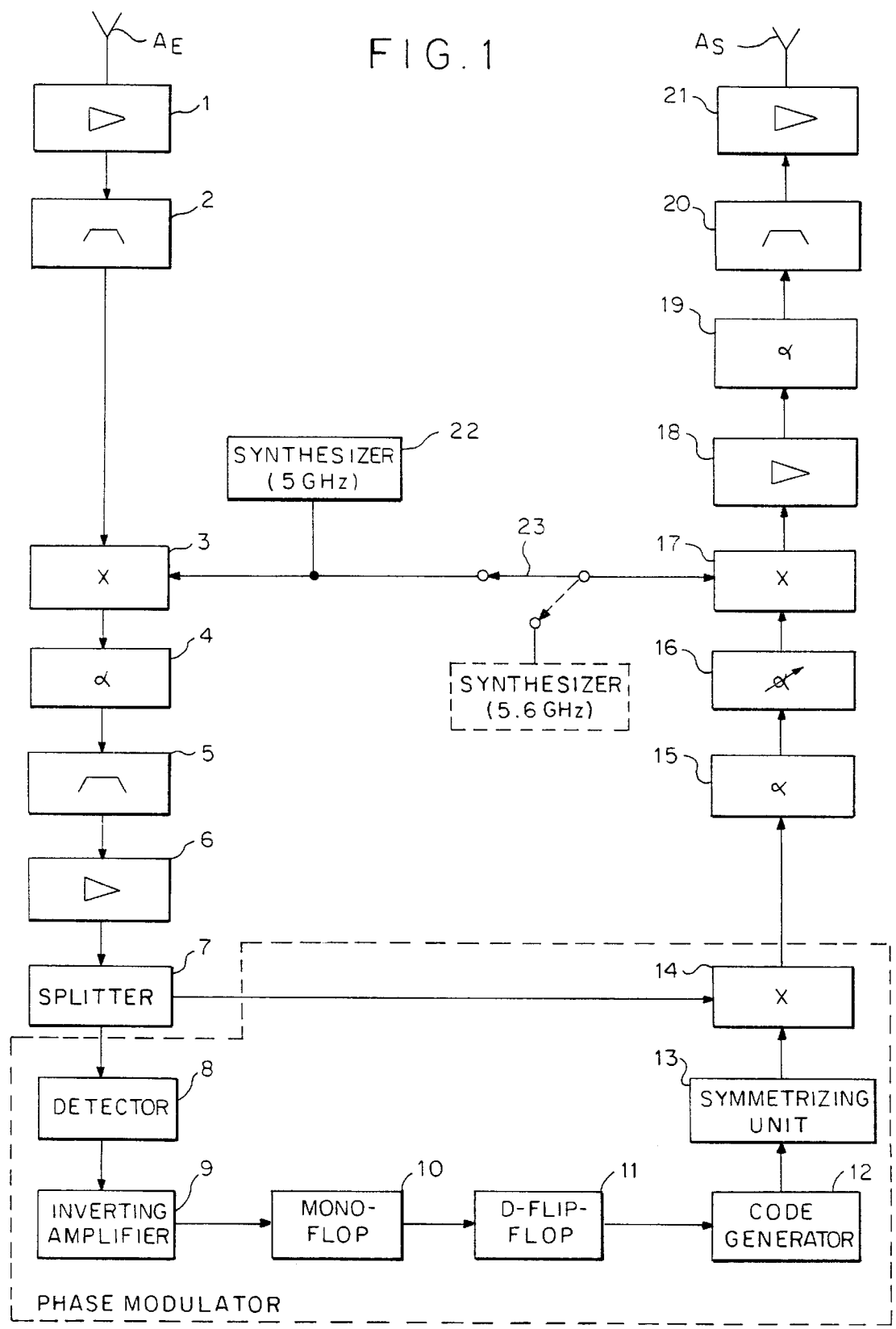

5,821,895

METHOD AND DEVICE FOR LOCATING AND IDENTIFYING OBJECTS BY MEANS OF AN ENCODED TRANSPONDER

FIELD OF THE INVENTION

The invention relates to a method for locating and identifying objects by means of an encoded transponder in combination with the use of an SAR (synthetic aperture radar) device carried in aircraft and spacecraft.

BACKGROUND OF THE INVENTION

Because of their independence from the weather, viewing conditions, and the status of the sun, imaging radar systems are being used more and more often. With the aid of the principle of synthetic aperture radar (SAR), high spatial resolution can be attained with compact antennas, regardless of the distance. This makes it possible to use SAR systems in aircraft and satellites. However, the attainable spatial resolution for certain applications is not sufficient, because objects whose size is comparable to that of the resolution cell can no longer be identified unambiguously and thus located.

As a rule, active or passive transponders are used to calibrate SAR equipment. Active transponders, because of their large, defined backscattering cross section, form a bright spot of known intensity in an SAR image. This intensity value can be utilized as a reference value in evaluating the intensities of the other image data. By an additional encoding of the radar signals, the transponder signal can be rendered visible only if suitable processing of the SAR data is done, i.e. correlation with the same code sequence.

German Patent Application DE 32 48 879 A1 discloses a method for generating artificial target marks in the image produced by synthetic aperture radar (SAR). In this method, a transparent echo pulse transmitter (a transponder) is disposed on the ground in an SAR-mapped area. Pulses originating in the SAR are received by the transponder; after a predetermined adjustment of their frequency, these pulses are offset, time delayed, amplified, and transmitted back again in such a way that the transponder echoes imaged by the SAR differ markedly in intensity and shape from the surroundings. Moreover, selectable positions, points, or areas in the terrain can be marked for the SAR with reference to a known coordinate system. The marking utilizes the SAR's own operating principle, that is, signal correlation in the range and azimuth direction without additional information channels or means.

The transponder's frequency conversion and time delaying of the input signals in no way significantly destroys the information content of these signals, since this involves linear frequency conversion in which the information remains unchanged. Thus the SAR system's own operating principle can continue to be employed for marking positions.

In the known active transponders used until now, it is a disadvantage that locating and identifying objects, especially in an environment with high reflectivity, is very difficult unless signal encoding is done.

OBJECTS AND SUMMARY OF THE INVENTION

The object of the invention is therefore a method and a device by which, using an encoded transponder, objects can be located and identified accurately and reliably, especially in an environment with high reflectivity.

In the method of the invention, pulses which originate in a SAR device that is carried in an aircraft or spacecraft (and is thus in motion) are received by a transponder and then subjected to modulation. By the modulation the signals are provided with an additional dominant signal structure and thus the signal structure is altered completely. Subsequently, these signals provided with an additional dominant signal structure are amplified again and transmitted back to the SAR device.

In the scene imaged by the SAR device, the transponder signals are thus not markedly highlighted against the surroundings by their intensity and shape (as for instance in the method known from DE 32 48 879 A1); instead, the transponder signals remain invisible in the SAR image. The method according to the invention thus serves to make targets "invisible". That is, if the SAR systems's own operating principle, namely signal correlation in the range and azimuth directions, is employed upon the signals passed through the encoded transponder operating according to the method of the invention, but as a result of the method of the invention, no points or areas are marked.

In the usual SAR method, Doppler modulation of a signal is employed to obtain the azimuth information (which is why accurate-phase reception is required in the SAR method). Such Doppler modulation is not used at all in the method at the present invention; instead, this phase information is destroyed by the type of modulation, in which the received signals are provided with an additional dominant signal structure.

By suitable processing of the data in the method of the invention the transponder is suppressed entirely in the SAR image by the SAR's own processing. In other words, in the method of the invention, the possibility exists of making either the transponder or the background visible. This is not possible in the method known from DE 32 48 879 A1.

Moreover, when the method of the invention is used in the transponder, the signal need not be intentionally delayed (as in the prior art discussed above) in order to shift the echo image to a point in the background that has low backscattering. Instead, in the invention the transponder is modulated with an identification code, which offers the advantage that no delay dependent on the image content has to be set. Moreover, since the transponder appears above out-of-focus background, even surrounding regions with high reflectivity present little or no disturbance.

In certain applications, the concealment of a transponder can be a very substantial advantage. One such application, for instance, is the identification of objects which are located and identified from an SAR satellite, but which other users of the satellite are not intended to know about. One specific example of this would be the tagging of weapons systems whose location is to be monitored in the context of a disarmament agreement.

An additional preferred feature of the invention is that the transponder has a modulator, for example in the form of a binary phase modulator, which impresses an additional dominant signal structure on received SAR signals. According to the invention, once the modulated code sequence is known, it is thus possible to perform a signal correlation (data processing) between the signals emitted by the transponder and the signals reflected by the environment.

BRIEF DESCRIPTION OF THE DRAWING

The above and other objects and the nature and advantages of the present invention will become more apparent from the following detailed description taken in conjunction with drawings, wherein:

FIG. 1 is a schematic or circuit block diagram of an embodiment of a transponder for performing the method of the invention.

DETAILED DESCRIPTION OF THE PREFERRED EMBODIMENTS

FIG. 1 shows signal processing starting from antennas $A_E$ and $A_S$ of the transponder of the present invention. Although it is not shown in detail in FIG. 1, a receiving antenna $A_E$ and a transmitting antenna $A_S$ of the present invention are rotated by 90° from one another, in order to achieve adequate decoupling in the form of polarization decoupling. The transponder includes blocks 1–6 for the receiving part of the transponder and blocks 15–21 for its transmitting part. Blocks 7–14 provided in between these form a modulator in the form of a binary phase modulator (mentioned above).

The various blocks 1–21 are connected to one another in the manner visible in the drawing and contain the following components and features:

As already noted, the receiving antenna $A_E$ and the transmitting antenna $A_S$, for the sake of polarization decoupling, are rotated each by 45° from the vertical polarization plane, which is equivalent to a signal attenuation of 3 dB each. A signal received by the antenna $A_S$ with an input power $P_{ET}$ of, for instance, −45 dBm is amplified by, for instance, 26 dB by a low-noise amplifier 1. In a following band-pass filter 2 for the C-band, interfering signal components are suppressed.

Mixer 3 mixes downward from the C-band to an intermediate frequency (IF) of, for example, 300 MHz. A mixed frequency (of, for instance, 5 GHz, whose level is approximately 7 dBm, is generated by an external synthesizer 22. The downward mixing done here is for the sake of better signal processing. By means of an attenuator 4 following the mixer 3, the frequency components reflected by a filter 5 are suppressed, and the attenuator 4 therefore serves to set the total gain. The filter 5 is an IF band-pass filter, which suppressses interfering frequencies that are produced by the downward mixing.

An amplifier 6 effects an amplification of the signal to a level of zero dBm, which is equivalent to a gain of approximately 36 dB.

In a splitter 7 following the amplifier 6, the RF signal is split into two paths, one of which leads to a clock generator while the second path leads to the phase modulator (blocks 8–14). A detector 8 following the splitter 7 generates the envelope curve of the incoming high-frequency pulse. The output signal of the detector 8 has a negative polarity, and its amplitude is proportional to the input level.

An operational amplifier 9 operates in inverting fashion, in order to raise the negative output signal of the detector 8 to the TTL voltage level. The amplifier 9 is connected as a comparator, in order to assure a switchover between logic "0" and logic "1" at a certain switching threshold. The TTL signal is a rectangular pulse signal that has the same pulse repetition frequency and pulse length as the signal before the amplifier 9.

In a monoflop 10 following the amplifier 9, a clock pulse (trigger) with a length of, for instance, 1 μs is generated. The clock pulse is derived from the trailing edge of the rectangular pulse signal.

The reasons for generating a trigger signal with a trailing edge are as follows:

(1) The high-frequency pulse signal has a short transit time from the splitter 7 to the phase modulator (blocks 8–14).

(2) The signal transit times for the clock generation and the clocked code emission are several times longer than for the detector.

(3) If the clock pulse were generated with a leading pulse edge, then the phase in the phase modulator would be phase shift keyed shortly after the beginning of the high-frequency pulse. This would produce a defective signal structure that could not be defined.

For these reasons, the clock generation is done with the trailing pulse edge, which causes phase shift keying not to occur until after the high-frequency pulse that generated the clock pulse. As a result, the first arriving high-frequency pulse passes through the modulator without phase shift keying. (Since in the initial state the code is at "0" this phase position is defined as the 0° phase.)

A clock pulse display is effected by means of a D-flip-flop 1, which triggers an LED. With the first clock pulse generated, the display lights up, and it can be erased by a scanner (RESET) after the clock pulse fails to appear, which indicates the end of the signal. In a following code generator 12, a code with a length of 1023 bits is generated. Two diode pairs of a ring mixer 14 are controlled by this serially-output code (one bit per clock pulse) The code status accordingly forms a reference for the phase position of the high-frequency pulses.

A symmetrizing unit 13 converts the code signal (at TTL level) into a bipolar signal (±2 V), as the following ring mixer 14 can be controlled with a bipolar signal.

In the ring mixer 14, the high-frequency pulses are present at the low-frequency input, and the code signal for phase shift keying is present at the intermediate frequency (IF) input. The phase shift keying (PSK=Phase Shift Keying) is effected by switching between the two paths of the splitter 7. The phase-modulated signal is picked up at the high-frequency output RF (for Radio Frequency).

One fixed attenuator 15 and one variable attenuator 16 serve to set the total gain of the signal. In a mixer 17 following the damping elements 15 and 16, the signal is mixed upward from the intermediate frequency to the C-band by means of the external synthesizer 22, which has a mixing frequency of 5 GHz and a level of about 7 dBm. The following two-stage C-band amplifier 18 effects a signal gain of 22 dB.

The frequency components reflected by a band-pass filter 20 are intended to be suppressed by means of a further attenuator 19; the attenuator 19 thus serves to set the total gain. By means of the band-pass filter 20 in the C-band interference frequencies caused by the upward mixing are suppressed. By means of a power amplifier 21, the transmitted signal is brought to the required levels.

With the aid of the code modulation, after processing of an SAR image the transponder is put out of focus so that it is suppressed in the image. Since the extent of suppression is not sufficient in certain circumstances to make the transponder completely invisible, the pulse spectrum ("chirp") that is used by the SAR equipment is inverted. In combination with the optimization of the transmission power of the transponder, this makes the transponder invisible. If the SAR data are processed taking into account the code and the altered chirp direction, then the transponder can be focused and located as a bright spot.

With the device for performing the method of the invention, range modulation can be selectively performed in addition to the azimuth modulation. This is done by inversion of the intra-modulated SAR transmission signal (chirp); an upward chirp is converted into a downward chirp, or vice versa. This is achieved by corresponding conversion of the transponder signals.

The transponder described thus far in conjunction with FIG. 1 is designed for an intermediate frequency of 300 MHz. By using various different mixing frequencies in the transmitting and receiving parts of the transponder, an inversion of the chirp modulation is effected. To this end, a switch 23 (schematically suggested in FIG. 1) is provided, with which a switchover can be made between the synthesizer 22 and a synthesizer 24 shown in dashed lines, the latter having a mixing frequency of 5.6 GHz.

By means of an additional, selectively-performed range modulation the transponder can be suppressed additionally by $\geq 25$ dB in the SAR image. The suppression in the azimuth and range directions then amounts to a total of $\geq 50$ dB. Natural point targets are then also suppressed by the same amount in the case of processing adapted to the structures of the transponder signals.

Two methods with one encoded transponder are thus created, with the aid of which objects can be identified in such a way that they can be detected unequivocally in the SAR image. In both methods, the transponder in a conventionally processed SAR image is suppressed, and in both methods already existing and used SAR systems can be used without any modification.

In the first method, the SAR signal received in the transponder is phase-shift keyed by a pseudo-noise code sequence before being broadcast again. As a result, the transponder is put out of focus in the SAR image. Once this code or the pseudo noise code train is known and suitable processing of the SAR data is done, the transponder can be focused and located in the SAR image without localization errors. The code then identifies the transponder and the object on which the transponder is mounted. Despite a somewhat higher expenditure for processing the data and limited suppression of the transponder in the conventionally processed SAR image, the advantages of this method are the simplicity of transponder design and the negligible localization error.

In the second method, in addition to the phase shift keying (PSK) of the received pulses, the chirp modulation generated by the SAR for pulse compression is inverted in the transponder. As a result, the transponder is further suppressed in the conventionally processed SAR image and is thus entirely invisible. Because of the inversion of the chirp modulation, the Doppler modulation of the transponder signal vanishes, and the SAR resolution is lost In processing of the SAR data with inverted chirp modulation and with the aid of the synchronized code, the transponder can then be detected. The transponder can be located in the SAR image by a determination of the center point of the transponder amplitude (i.e., weighted center point or "center of gravity"). The special advantages of this method reside in its simpler data processing and the complete suppression of the transponder signal in the conventionally processed SAR image. A transponder suitably encoded according to the invention can be used generally in both the military and the civilian area, to locate and identify various types of objects. In the military area, for instance, military vehicles could be detected and accurately located. In the civilian area, icebergs, for instance, could be found and followed over a relatively Long period of time and thus accurately located.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A device for locating and identifying objects with an SAR device carried in aircraft and spacecraft, comprising:

an encoding transponder for use in combination with the SAR device;

means for sending signals from the SAR device to the transponder;

means for providing an additional dominant signal structure to the signals received by the transponder; and means for subsequently retransmitting the signals back to the SAR device; wherein the transponder includes a receiving part, a transmitting part, and a modulation part therebetween;

the receiving part includes a receiving antenna ($A_E$), an amplifier (1), a band-pass filter (2), a first mixer (3), a damping element (4), an intermediate-frequency band-pass filter (5), and a second amplifier (6);

the transmitting part includes a transmitting antenna ($A_S$), one fixed attenuator (15), one variable attenuator (16), a second mixer (17), a third amplifier (18), a further attenuator (19), and a further band-pass filter (20); and the modulation part includes a splitter (7), a detector (8) following the splitter, an operational amplifier (9), a monoflop (10), a clock pulse display (11) formed by a D-flip-flop, a code generator (12) following the clock pulse display, a symmetrizing unit (13), and a ring mixer (14); and wherein the transponder includes at least one integrated or external synthesizer (22) between the first mixer (3) in the receiving part and the second mixer (17) in the transmitting part.

2. A method for locating and identifying objects with an SAR device carried in aircraft or spacecraft, the method comprising:

encoding SAR signals with a signal modulation in the SAR device;

sending the signals from the SAR device to the transponder;

encoding the signals received by the transponder with an inverse signal modulation in the transponder;

amplifying the signals prior to transmitting the signals back to the SAR device; and subsequently retransmitting the signals back to the SAR device;

whereby the transponder is invisible on a SAR image.

3. The method according to claim 2, wherein the signal modulation comprises chirp modulation and the inverse signal modulation comprises inverse chirp modulation, whereby an upward chirp is converted into a downward chirp, and a downward chirp is converted into an upward chirp.

4. The method according to claim 3, wherein the inverse chirp modulation uses various mixed frequencies in transmitting and receiving parts of the transponder.

5. The method according to claim 2, wherein the signal modulation destroys phase information.

6. The method according to claim 5, wherein the signal modulation further comprises additional dominant signal structure.

7. The method according to claim 2, wherein the signal modulation comprises distance modulation and includes no Doppler modulation.

* * * * *